United States Patent
Raphael et al.

(10) Patent No.: US 11,556,514 B2
(45) Date of Patent: Jan. 17, 2023

(54) SEMANTIC DATA TYPE CLASSIFICATION IN RECTANGULAR DATASETS

(71) Applicant: International Business Machines Corporation, Armonk, NY (US)

(72) Inventors: Roger C. Raphael, San Jose, CA (US); Mu Qiao, Belmont, CA (US); Scott Schumacher, Porter Ranch, CA (US); Angineh Aghakiant, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 17/184,122

(22) Filed: Feb. 24, 2021

(65) Prior Publication Data

US 2022/0269663 A1    Aug. 25, 2022

(51) Int. Cl.
| | |
|---|---|
| *G06F 16/22* | (2019.01) |
| *G06F 16/25* | (2019.01) |
| *G06F 16/21* | (2019.01) |
| *G06N 20/00* | (2019.01) |
| *G06F 40/30* | (2020.01) |
| *G06K 9/62* | (2022.01) |

(52) U.S. Cl.
CPC ........ *G06F 16/2282* (2019.01); *G06F 16/213* (2019.01); *G06F 16/221* (2019.01); *G06F 16/258* (2019.01); *G06F 40/30* (2020.01); *G06K 9/6256* (2013.01); *G06N 20/00* (2019.01)

(58) Field of Classification Search
CPC .. G06F 16/2282; G06F 16/213; G06F 16/221; G06F 16/258; G06F 40/30; G06K 9/6256; G06N 20/00
See application file for complete search history.

(56) References Cited

U.S. PATENT DOCUMENTS

| | | |
|---|---|---|
| 10,296,192 B2 | 5/2019 | Stojanovic et al. |
| 10,620,923 B2 | 4/2020 | Allan et al. |
| 10,620,924 B2 | 4/2020 | Stojanovic et al. |
| 10,705,812 B2 | 7/2020 | Seetharaman et al. |

(Continued)

OTHER PUBLICATIONS

Anonymous, "Recognizing Semantic Formatting Information in a Document," an IP.com Prior Art Database Technical Disclosure, IP.com No. IPCOM000251990D, Dec. 13, 2017, 35 pgs.

(Continued)

*Primary Examiner* — Dangelino N Gortayo
(74) *Attorney, Agent, or Firm* — Peter K. Suchecki

(57) ABSTRACT

Provided is a method, computer program product, and system for automatically predicting unknown semantic data types in a rectangular dataset using a holistic knowledge of said dataset. A processor may receive one or more rectangular datasets, the one or more rectangular datasets comprising a plurality of columns having a set of known semantic data types. The processor may extract a set of features from the plurality of columns, where the set of features is used to determine a relationship among each column of the plurality of columns. The processor may construct a set of training data based on the extracted set of features. Using the training data, the processor may train a machine learning model to predict a semantic data type of a target column in a rectangular dataset having an unknown semantic data type.

18 Claims, 8 Drawing Sheets

(56) References Cited

U.S. PATENT DOCUMENTS

| | | | | |
|---|---|---|---|---|
| 2019/0102620 | A1* | 4/2019 | Siddiq | G06V 30/416 |
| 2020/0218750 | A1* | 7/2020 | Liu | G06F 16/358 |
| 2020/0311070 | A1* | 10/2020 | Yan | G06N 20/00 |
| 2021/0089822 | A1* | 3/2021 | Baek | G06N 20/10 |
| 2021/0312223 | A1* | 10/2021 | Klaiman | G06V 10/751 |
| 2021/0326519 | A1* | 10/2021 | Lin | G06F 40/18 |

OTHER PUBLICATIONS

Anonymous, "Visualization recommendation system using a hybrid machine learning approach," an IP.com Prior Art Database Technical Disclosure, IP.com No. IPCOM000260192D, Oct. 30, 2019, 4 pgs.

Chen et al., "ColNet: Embedding the Semantics of Web Tables for Column Type Prediction," The Thirty-Third AAAI Conference on Artificial Intelligence (AAAI-19), pp. 29-36, © 2019 Association for the Advancement of Artificial Intelligence.

Gudivada et al.,"Data Quality Considerations for Big Data and Machine Learning: Going Beyond Data Cleaning and Transformations," International Journal on Advances in Software, vol. 10, No. 1 and 2, 2017, http://www.iariajournals.org/software, 20 pgs.

Hulsebos, et al., "Sherlock: A Deep Learning Approach to Semantic Data Type Detection," arXiv:1905.10688v1 [cs.LG] May 25, 2019, 9 pgs.

Kumar et al., "Machine Learning Based Predictive Model for Analyzing the Sentiments in Short Text," an IP.com Prior Art Database Technical Disclosure, IP.com No. IPCOM000239081D, Oct. 10, 2014, 10 pgs.

Meij et al., "Method and System for Learning Latent Features for Query Intent Classification," an IP.com Prior Art Database Technical Disclosure, IP.com No. IPCOM000256976D; Jan. 10, 2019, 3 pgs.

Mell et al., "The NIST Definition of Cloud Computing," Recommendations of the National Institute of Standards and Technology, U.S. Department of Commerce, Special Publication 800-145, Sep. 2011, 7 pgs.

Pham et al., "Semantic labeling: A domain-independent approach," http://usc-isi-i2.github.io/papers/pham16-iswc.pdf, 2016, 16 pgs.

Venetis et al., "Recovering Semantics of Tables on the Web," Proceedings of the VLDB Endowment 4, 9 (2011), pp. 528-538.

Zhao et al., "Object Detection with Deep Learning: A Review," arXiv:1807.05511v2 [cs.CV] Apr. 16, 2019, 21 pgs.

Jiang et al., "Time Series Prediction for Evolutions of Complex Systems: A Deep Learning Approach," 2016 IEEE International Conference on Control and Robotics Engineering, Conference Paper, Apr. 2016, DOI: 10.1109/ICCRE.2016.7476150, 7 pgs.

* cited by examiner

SEMANTIC DATA TYPE CLASSIFICATION IN RECTANGULAR DATASETS

BACKGROUND

The present disclosure relates generally to the field of semantic data type classification and, more specifically, to predicting, calibrating, and/or reinforcing manual or log precision annotations of unknown semantic data types in rectangular datasets using a holistic approach.

Semantic data type detection and/or classification may be used to improve various data preparation techniques and application functionalities. For example, by classifying various unknown semantic data types to incorporate accurate data descriptions, retrievals tasks such as data cleaning, schema matching, data discovery, information integration, semantic search, data visualization, and high-level business object detection may be improved as a result.

SUMMARY

Embodiments of the present disclosure include a method, computer program product, and system for predicting unknown semantic data types in rectangular datasets using a holistic approach. A processor may receive one or more rectangular datasets, the one or more rectangular datasets comprising a plurality of columns having a set of known semantic data types. The processor may extract a set of features from the plurality of columns, where the set of features is used to determine a relationship among each column of the plurality of columns. The processor may construct a set of training data based on the extracted set of features. Using the training data, the processor may train a machine learning model to predict a semantic data type of a target column in a rectangular dataset having an unknown semantic data type.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
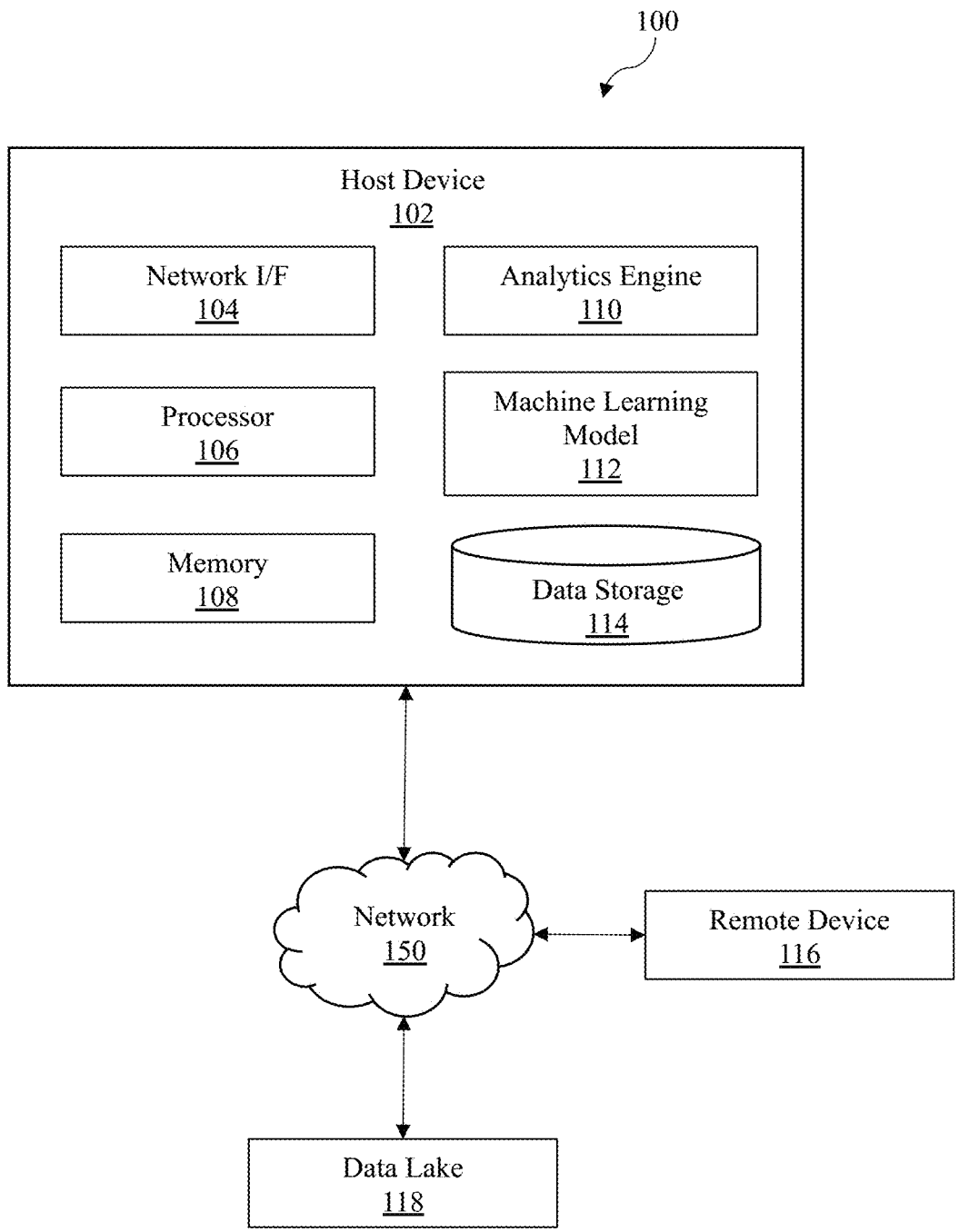
FIG. 1 illustrates a block diagram of an example sematic data type classification system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of semantic data type classification and, more particularly, to predicting unknown semantic data types in rectangular datasets using a holistic approach. While the present disclosure is not necessarily limited to such applications, various aspects of the disclosure may be appreciated through a discussion of various examples using this context.

Semantic data type detection and/or classification may be used to improve various data preparation techniques and application functionalities. For example, by classifying various unknown semantic data types to incorporate accurate data descriptions, data science and engineering tasks such as data cleaning, schema matching, data discovery, information integration, semantic search, and data visualization may be improved as a result.

A rectangular dataset may comprise data in a columnar format such as a database table, relationship table, or matrix. Each column of the rectangular dataset may include a name or header (field) and data of a specific type. For example, a column may include a semantic data type such as an organization name (e.g., Company A, Company B, Company C, etc.), address, zip code, telephone number, location, package number, etc. In some instances, a column or columns may include unknown semantic data types due to a missing or incomprehensible header.

Various techniques have been developed to predict or determine the unknown semantic data types to improve data preparation procedures. For example, a matching-based approach may use regular expression matching and dictionary lookup tables to attempt to identify the unknown semantic type. Other approaches for semantic data type classification include an ontology-based approach that leverages existing data on the web to construct a database of value-type mappings and a feature-based approach that uses similarity metrics as features to compare against labeled domain data. In some instances, the feature-based approach may utilize deep learning to detect semantic data types by considering features such as character-level distribution, word embeddings, and paragraph vectors. These above approaches may be useful when attempting to identify semantic data types in rectangular datasets. However, these approaches may suffer from prediction inefficiencies by failing to account for the various features and characteristics of the rectangular dataset as whole when attempting to determine unknown semantic data types of a specific targeted column.

Embodiments of the present disclosure include a system, method, and computer program product that may predict unknown semantic data types in rectangular datasets by using both a local and holistic feature-based approach. The system may utilize machine learning to infer any missing or unknown semantic data types of a rectangular dataset by considering the local features and/or characteristics of a target column (e.g., a column having unknown semantic data type), and the holistic features and/or characteristics of one or more other columns having known semantic data types within the same rectangular dataset.

In embodiments, the system may be initially trained by analyzing rectangular datasets with known semantic data types. For example, the system may extract a set of features and/or characteristics from one or more rectangular datasets having a plurality of columns with known semantic data types. The system may construct a set of training data (e.g., feature vectors including data type labels) using the extracted features to determine various relationships between each of the plurality of columns and their known semantic data types. For example, each rectangular dataset may be represented by as a matrix, where each row represents a single data point, and each column represents an attribute. Using a collection of matrices having known semantic data types, the machine learning model can be trained to predict unknown semantic data types. In embodiments, the constructed training data may be used to train a machine learning model using one or more machine learning algorithms (e.g., using logistic regression or Support Vector Machines (SVM), and the like).

In embodiments, the machine learning model may be trained to identify the unknown semantic data type of one or more target columns of an inputted rectangular dataset. The machine learning model may identify relationships between the target column's local features (e.g., primitive data type, name, entropy, length of column, etc.) and the holistic features of all other columns (e.g., known semantic data type, names, correlation coefficient, etc.) of the inputted rectangular dataset in order to identify or infer the likelihood of a specific semantic data type for the unknown semantic data type of the target column.

For example, the machine learning model may predict that a target column containing a set of unknown data is a set of email addresses by identifying and/or correlating similarities of the local features (e.g., presence of "@" or an email address extension) of the target column with the holistic features of the other columns in the dataset (e.g., employee names, other email addresses, email extensions, telephone numbers, zip codes, and the like).

In this way, the machine learning model can predict what a specific semantic data type for the target column may be by corroborating various information, characteristics, and/or features from the other columns in the rectangular dataset based on a variety of relationships between the known and unknown semantic data types. Once the specific semantic data type for the target column has been determined, a user (e.g., data lake administrator) may verify the accuracy of the semantic data type. Once verified, the machine learning model may be retrained using the that rectangular dataset having the verified semantic data type for the target column. Over time, as the machine learning model determines and/or infers more semantic data types for target columns having missing/unknown data types from new or additional rectangular datasets, the machine learning model may improve its prediction accuracy and/or performance when handling various data preparation tasks.

In some embodiments, the machine learning model may be configured to automatically retrain itself without the need to have a user manually verify the predicted semantic data type for the target column. For example, the machine learning model may generate a likelihood value indicating how likely or probable that a target column is a specific semantic data type. This likelihood value may be compared to a predetermined threshold and if the threshold is met, the machine learning model may be retrained automatically using the predicted semantic data type for the target column. This obviates the need for the system to require administrator verification when performing retraining or data preparation procedures. However, in some embodiments, the system may still send a notification to inform a user that the machine learning model was retrained using the inferred/predicted semantic data type for a given target column.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of example semantic data type classification system 100, in accordance with embodiments of the present disclosure. In the illustrated embodiment, semantic data type classification system 100 includes host device 102 that is communicatively coupled to remote device 116 and data lake 118 via network 150. Host device 102 and remote device 116 may be configured as any type of computer system and may be substantially similar to computer system 1101 of FIG. 6. In embodiments, host device 102 and/or remote device 116 may be a standalone computing devices or virtual software applications. For example, host device 102 may be a virtual application located on a server (not shown) that is accessed by remote device 116 through a cloud computing network, while remote device 116 may be configured as a personal computer (e.g., laptop, desktop, smartphone, etc.) operated by a user (e.g., data lake administrator). In embodiments, host device 102 may be configured as a discovery service configured to analyze rectangular datasets received from data lake 118 and/or from remote device 116. Data lake 118 may be configured as data repository or data storage system that stores data in a raw format. For example, data lake 118 may include raw copies of system data, sensor data, social data, and/or transformed data used for tasks such as reporting, visualization, advanced analytics, and machine learning. Data lake 118 may include structured data from relational databases (e.g., rectangular datasets), semi-structured data, unstructured data, and/or binary data. Data lake 118 may be established on-premises (e.g., within an organization's data center) or in a cloud computing environment.

Network 150 may be any type of communication network, such as a wireless network or a cloud computing network. Network 150 may be substantially similar to, or the same as, cloud computing environment 50 described in FIG. 7. In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

In some embodiments, network 150 can be implemented using any number of any suitable communications media. For example, the network may be a wide area network (WAN), a local area network (LAN), a personal area network (PAN), an internet, or an intranet. In certain embodiments, the various systems may be local to each other, and communicate via any appropriate local communication medium. For example, host device 102 may communicate with remote device 116 and data lake 118 using a WAN, one or more hardwire connections (e.g., an Ethernet cable), and/or wireless communication networks. In some embodiments, the various systems may be communicatively coupled using a combination of one or more networks and/or one or more local connections. For example, in some embodiments host device 102 may communicate with data lake 118 using a hardwired connection, while communication between remote device 116 and host device 102 may be through a wireless communication network.

In the illustrated embodiment, host device 102 includes network interface (I/F) 104, processor 106, memory 108, analytics engine 110, machine learning model 112, and data storage 114. In embodiments, the remote device 116 and data lake 118 may also contain similar components (e.g., processors, memories, network I/F, analytics engines, data storage) as host device 102, however, for brevity purposes these components are not shown.

In embodiments, analytics engine 110 is configured to receive, collect, and/or analyze one or more rectangular datasets. The rectangular datasets may be received or collected from data lake 118 and/or remote device 116. For example, the analytics engine 110 may be configured to automatically receive rectangular datasets as part of one or more automated data preparation procedures (e.g., automated data cleaning, schema matching, data discovery, information integration, or indexing/search procedures). In another example, the analytics engine 110 may receive the rectangular datasets from remote device 116 via a user input. Analytics engine 110 is configured to perform feature extraction (e.g., generate feature vectors) on each rectangular dataset to determine characteristics or features of each column of the rectangular dataset. Analytics engine 110 may perform feature extraction at both a local view (e.g., extract features from individual columns, such as known columns or a target column) and at a holistic view (e.g., extract features comprehensibly across all columns of the rectangular dataset). For example, the analytics engine 110 will extract features individually from a target column having an unknown data type, while further extracting features from all other columns in the rectangular dataset in order to determine relationships between the characteristics of the target column and all other columns. An example set of extracted features is described in FIG. 3. Analytics engine 110 may use the extracted features from the rectangular dataset to construct a set of training data that is used to train machine learning model 112.

In embodiments, machine learning model 112 may comprise various machine learning models or models (e.g., logical regression, support vector machines (SVM), artificial neural network, deep neural network, correlation engines, reinforcement feedback learning model, supervised/unsupervised learning model, etc.) configured to analyze feature extraction data generated by the analytics engine 110 to improve predictions for inferring specific semantic data types for target columns having unknown data types. For example, machine learning model 112 may be trained to identify relationships between the target column's features (e.g., primitive data type, name, entropy, length of column, etc.) and the features of all other columns (e.g., known semantic data type, names, correlation coefficient, etc.) in the rectangular dataset in order to identify, predict, or infer the likelihood of a specific semantic data type for the unknown data type of the target column.

In some embodiments, machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

FIG. 1 is intended to depict the representative major components of semantic data type classification system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with semantic data type classification system 100 may not be present, and the arrangement of components may vary.

For example, while FIG. 1 illustrates an example semantic data type classification system 100 having a single host device 102, a single remote device 116, and a singled data lake 118 that are communicatively coupled via a single network 150, suitable network architectures for implementing embodiments of this disclosure may include any number of host devices, remote devices, data lakes, and networks. The various models, modules, systems, and components illustrated in FIG. 1 may exist, if at all, across a plurality of host devices, remote devices, and networks.

Figure 2A:
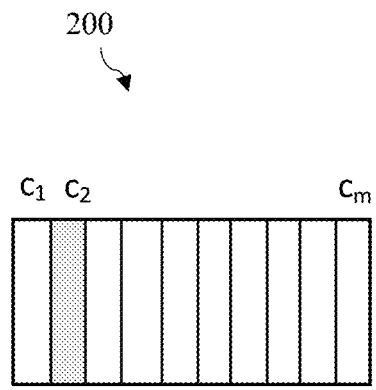
FIG. 2A illustrates an example representation of a rectangular dataset that uses a local view feature-based approach for determining semantic data types, in accordance with embodiments of the present disclosure.

Referring now to FIG. 2A, shown is an example representation of a rectangular dataset 200A using a local view feature-based approach for determining semantic data types, in accordance with embodiments of the present disclosure. In the illustrated embodiment, rectangular dataset 200 (e.g., database table, relationship table, matrix, etc.) comprises a set of columns indicated as $c_1$, $c_2$, through $c_m$ and rows (not shown). Each column contains a field or header and is limited to data of a specific type, while each row is configured as an observation point of that data. In embodiments, each column may include a semantic data type related to the attributes, features, and/or characteristics of the data in the given column. For example, the semantic data type may include characteristics such as name, address, zip code, data type, optional synonyms, descriptions on how the data should be used, etc. However, some columns (e.g., a target column or unknown semantic type column) may include unknown data types. For example, column $c_2$ of rectangular dataset may include an incomprehensible header, and therefore the semantic data type within the column $c_2$ may be unknown. Analytics engine 110 may perform feature extraction on column $c_2$ (the target column) to determine a set of characteristics or local features related to the given column. In other words, the analytics engine 110 determines the features of just the data in the target column when performing a local view feature-based approach. This is illustrated by only column $c_2$ being highlighted in FIG. 2A. An example set of features extracted at the local view are described in FIG. 3.

Figure 2B:
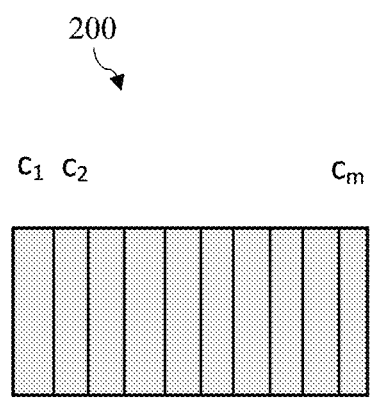
FIG. 2B illustrates an example representation of a rectangular dataset that uses a holistic view feature-based approach for determining semantic data types, in accordance with embodiments of the present disclosure.

Referring now to FIG. 2B, shown is an example representation of a rectangular dataset 200 using a holistic view feature-based approach for determining semantic data types, in accordance with embodiments of the present disclosure. In the illustrated embodiment, analytics engine 110 is configured to perform feature extraction on all columns $c_1$, $c_2$, through $c_m$ of rectangular dataset. This is shown by every column being highlighted in FIG. 2B. An example set of features extracted at the holistic view is described in FIG. 3.

In some embodiments, analytics engine 110 may generate and/or construct a set of training data from the local features extracted individually from each column of columns $c_1$, $c_2$, through $c_m$ using a local view feature-based approach similar to FIG. 2A and the holistic features extracted from all columns $c_1$, $c_2$, through $c_m$ shown here in FIG. 2B. The set of training data is further described in FIG. 4. The set of training data is used to train machine learning model 112 to predict and/or infer unknown semantic data types for the target column.

Figure 3:
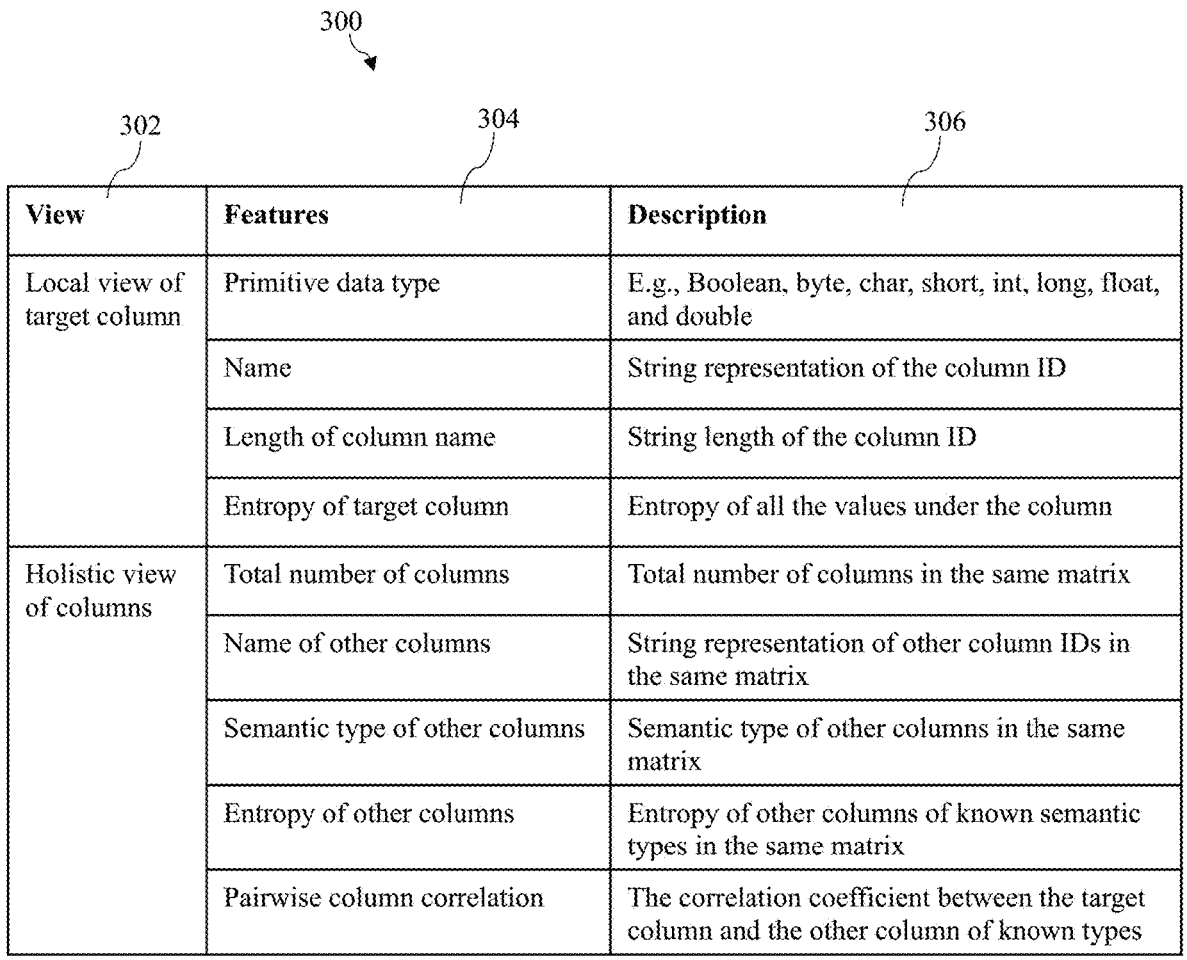
FIG. 3 illustrates an example feature table indicating relevant features to be extracted at a local view for a target column and a holistic view for other columns of a rectangular dataset, in accordance with embodiments of the present disclosure.

Referring now to FIG. 3, shown in an example feature table 300 indicating relevant features to be extracted at the local view of the target column and the holistic view of all other columns of a rectangular dataset, in accordance with embodiments of the present disclosure. In the illustrated embodiment, feature table 300 includes the type of view 302 (e.g., local view or holistic view feature extraction approach), an example set of features 304 at each type of view 302, and a description 306 of the given feature for the target column or all other columns of the rectangular dataset. It is noted that more or less features may be included in this table 300 depending on the given rectangular dataset, and that this feature table 300 is not meant to be limiting.

In the illustrated embodiment, features 304 extracted at the local view of the target column 302 include primitive data type, name, length of column name, and entropy. Primitive data type may include various data types (e.g., Boolean, byte, char, short, int, long, float, and double). Name is configured as a string representation of the column ID. Length of column name may include the string length of the column ID. Entropy of the target column may include all entropy for all the values of the target column.

In embodiments, entropy (e.g., semantic entropy) is a measure of semantic ambiguity and un-informativeness. Entropy is a graded lexical feature which may play a role anywhere lexical semantics plays a role. For example, semantic entropy can be interpreted as semantic ambiguity and be used to predict the difficulty of disambiguating the sense of a given word. In some embodiments, the system may utilize various machine learning techniques (e.g., disambiguation algorithms) that favor precision over recall to ignore words with high semantic entropy. In other words, the system may use entropy to decide not only how to work with various words, but also which words to work with and which words to ignore when predicting semantic data types for target columns.

For example, the system may analyze a set of data in a column that has text (e.g., words) containing an "@" in each row. This column may be determined to have a low entropy measure because the "@" in the text most likely indicates the set of data in the column pertains to email addresses. Alternatively, a second column may be determined to have a high entropy measure because the column contains a second set of data containing a combination of random numbers and letters that are ambiguous (e.g., not forming natural language text). In such an instance, the system may ignore using the second set of data if the entropy measure is too high when making semantic data type predictions.

In the illustrated embodiment, features 304 extracted at the holistic view of columns may include features 304 such as total number of columns (e.g., total number in the rectangular dataset or matrix), name of other columns in the rectangular dataset not including the target column (e.g. string representation of other column IDs), semantic type of other columns in the rectangular dataset, entropy of other columns (e.g., entropy of other columns of known semantic data types in the same rectangular dataset), and a column correlation (e.g., pairwise correlation/correlation coefficient between the target column and the other columns of known semantic types). Extracting features both at the local view of the target column and the holistic view for all other columns of the rectangular dataset allows the system to determine relationships between the characteristics of the target column and the other columns of the same dataset. In this way, the system may train a machine learning model to predict/infer what the unknown semantic data type are for the target column by corroborating information (e.g., characteristics, attributes, features, etc.) of adjacent or all other columns of the rectangular dataset.

Figure 4:
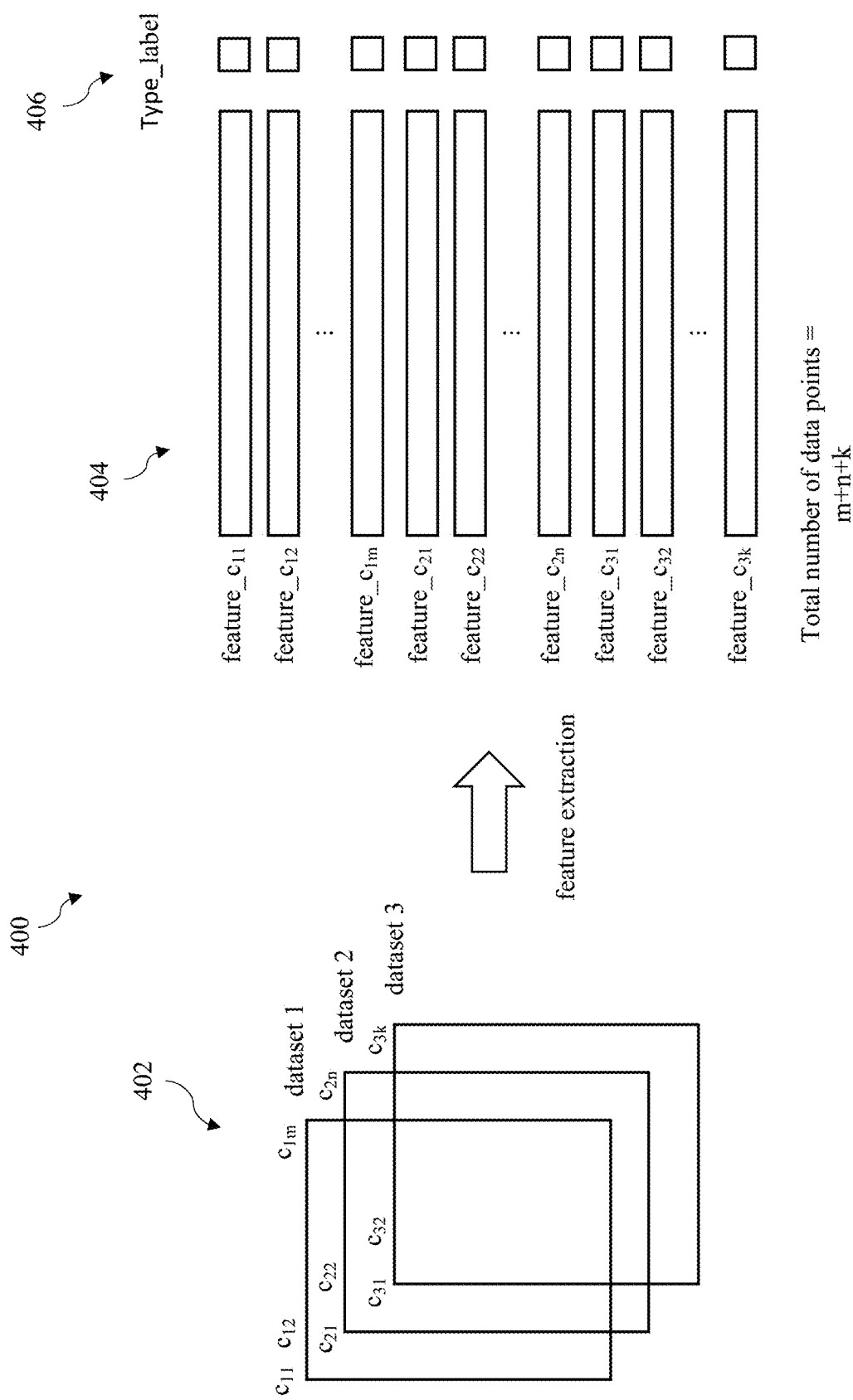
FIG. 4 illustrates an example diagram for extracting a set of features from a plurality of rectangular datasets, in accordance with embodiments of the present disclosure.

Referring now to FIG. 4, shown in an example diagram 400 for extracting a set of features 404 from a plurality of rectangular datasets 402, in accordance with embodiments of the present disclosure. In the illustrated embodiment, the plurality of rectangular datasets 402 includes dataset 1 comprising columns $c_{11}$, $c_{12}$, through $c_{1m}$, dataset 2 comprising columns $c_{21}$, $c_{22}$, through $c_{2n}$, and dataset 3 comprising columns $c_{31}$, $c_{32}$, through $c_{3k}$, where each of the columns includes a known semantic data type. Analytics engine 110 is configured to extract features from the columns (e.g., at both the local view for each column and the holistic view for all columns) of each of the rectangular datasets 402. Once feature extraction is preformed, the analytics engine 110 generates a set of features (e.g., feature vectors) at both the local view (individual column) and holistic view (all other columns), wherein the type label is identified as the semantic data type for each column. Using the set of features 404, the analytics engine 110 can construct/generate a set of training data (e.g., by totaling the number of data points=m+n+k) that can be used to train machine learning model 112 to identify an unknown semantic data type of a target column in an inputted rectangular dataset. This may be performed using any type of machine learning model (e.g., logistic regression, support vector machines (SVM), deep neural networks). Once the machine learning model 112 is trained to predict or infer semantic data types for target/unknown columns, the machine learning model can continuously learn via a feedback learning loop/mechanism to infer any missing data types of target columns associated with new rectangular datasets.

Figure 5:
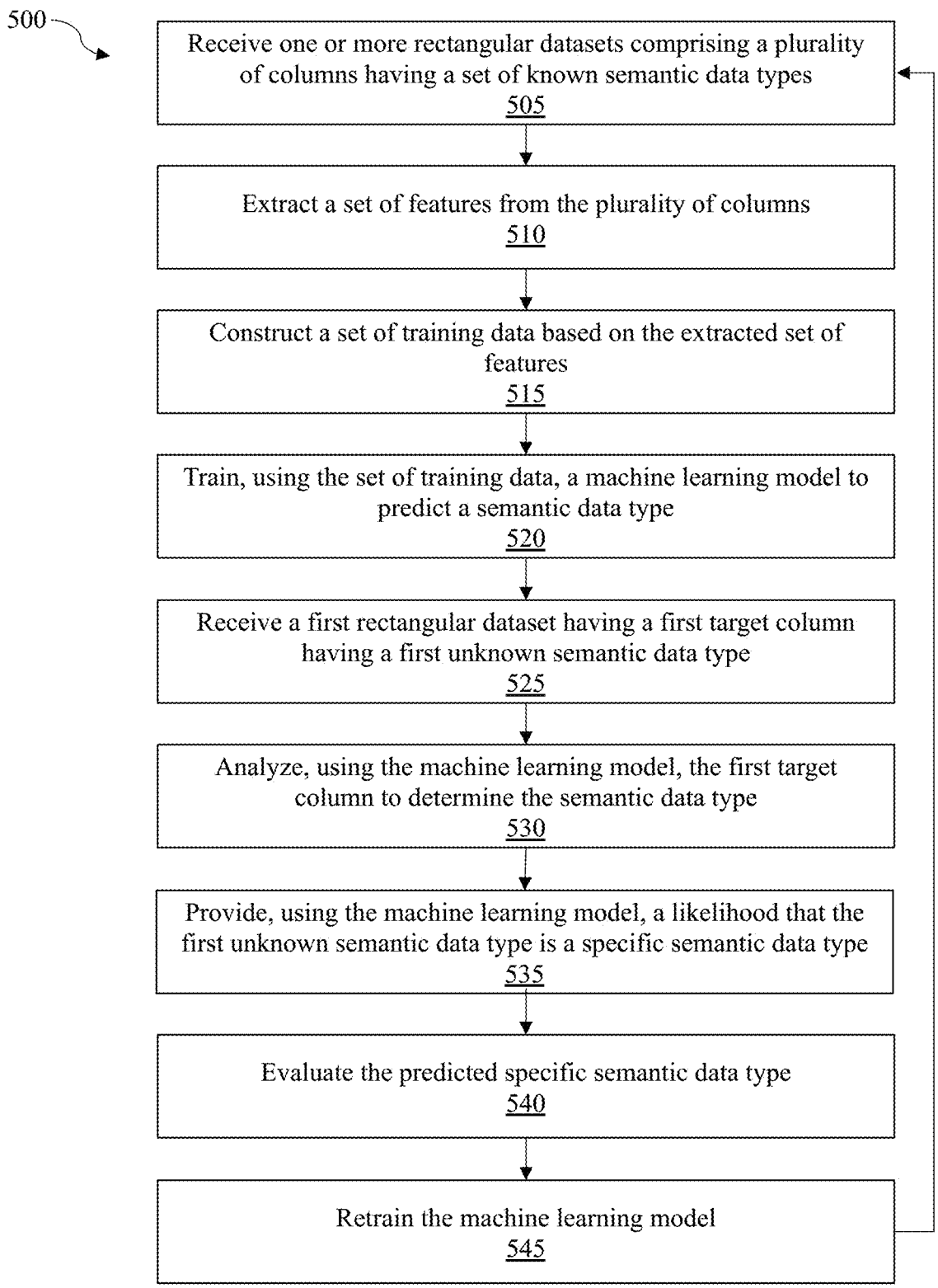
FIG. 5 illustrates a flow diagram of an example process for training a machine learning model to predict a specific semantic data type for a target column having an unknown semantic data type, in accordance with embodiments of the present disclosure.

Referring now to FIG. 5, shown is a flow diagram of an example process 500 for training a machine learning model to predict a specific semantic data type for a target column having an unknown semantic data type, in accordance with embodiments of the present disclosure. The process 500 may be performed by processing logic that comprises hardware (e.g., circuitry, dedicated logic, programmable logic, microcode, etc.), software (e.g., instructions run on a processor), firmware, or a combination thereof. In some embodiments, the process 500 is a computer-implemented process. The process 500 may be performed by processor 106 exemplified in FIG. 1.

The process 500 begins by receiving one or more rectangular datasets, the one or more rectangular datasets containing a plurality of columns having a set of known semantic data types. This is illustrated at step 505. For example, analytics engine 110 of host device 102 may receive the one or more rectangular datasets from data lake 118 or remote device 116 via a user input. In some embodiments, the rectangular dataset may be received automatically without user input. The plurality of columns may include known semantic data types such an organization name, street address, name, zip code, birthdate, and the like.

The process 500 continues by extracting a set of features from the plurality of columns. This is illustrated at step 510. In some embodiments, the set of features may include both local features (e.g., primitive data type, length of column, entropy, etc.) of the individual columns and holistic features (e.g., total number of columns, semantic data type of all columns, entropy, correlation coefficient, etc.) of the plurality of columns. In embodiments, the set of features is used to determine a relationship among each column of the plurality of columns.

The process 500 continues by constructing a set of training data based on the extracted set of features. This is illustrated at step 515. For example, the set of training data may comprise a set of feature vectors and their corresponding column semantic data types.

The process 500 continues by training, using the set of training data, a machine learning model to predict a semantic data type of a target column in a rectangular dataset having an unknown semantic data type. This is illustrated at step 520. For example, machine learning model 112 may be trained using machine learning algorithms, such as logistic regression or SVM, on the constructed feature vectors and their corresponding known semantic data types to predict semantic data types of unknown semantic data types of one or more target columns of an inputted rectangular dataset.

In some embodiments, the process 500 continues by receiving a first rectangular dataset containing a first target column having a first unknown semantic data type. This is illustrated at step 525. For example, a rectangular dataset may be inputted into the system that has a target column containing a set of integers values ranging from 1-100 that are an unknown semantic data type due to an incomprehensible or missing column header.

The process 500 continues by analyzing, using the machine learning model, the first target column to determine the semantic data type of the first unknown semantic data type. This is illustrated at step 530. The machine learning model may identify relationships between the target column's local features (e.g., primitive data type, name, entropy, length of column, etc.) and the holistic features of all other columns (e.g., known semantic data type, names, correlation coefficient, etc.) of the inputted rectangular dataset in order to predict or infer the likelihood of a specific semantic data type for the unknown semantic data type of the target column.

Returning to the previous example, the machine learning model may analyze the set of integer values (e.g., local features) of the first target column and correlate the values with a set of holistic features of a plurality of other columns containing known semantic data types. For example, the plurality of other columns may contain known semantic data types related to a corresponding set of birth dates, user names, and social security numbers. The machine learning model may predict, based on the correlating, the likelihood that the first unknown semantic data type is the specific semantic data type. Returning to the example, the machine learning model may predict that the first unknown semantic data type is an "age" value based on correlating the set of integers ranging from 1-100 to the set of birth dates, user names, and social security numbers in the other columns. For example, each integer (e.g., 25, 36, 50, 8, and so on) in the column may correspond to a specific birth date and user, indicating that this target column contains age values. In this way, the machine learning model may predict or infer the semantic data type of the target column by using the local features of the target column and the holistic features of all the columns in the rectangular dataset.

The process 500 continues by providing, using the machine learning model, a likelihood that the first unknown semantic data type of the first target column is a specific semantic data type. This is illustrated at step 535. The likelihood may include a confidence score based on the probability of the unknown semantic data type of the target column being the predicted specific semantic data type. The likelihood may be provided to a user (e.g., admin) for verification.

The process 500 continues by evaluating the predicted specific semantic data type for the target column. This is illustrated at step 540. In embodiments, this may be performed by the system receiving a user verification indicating that the likelihood of the unknown semantic data type being the specific semantic data type is accurate. For example, the verification may be sent from a data lake administrator tasked with evaluating the predicted semantic data type for the target column.

The process 500 continues by retraining, in response to the user verification, the machine learning model using the first rectangular dataset, where the first target column is classified as the specific semantic data type. This is illustrated at step 545. For example, if the specific semantic data type has been verified by an administrator to be accurate or correct, the machine learning model will continuously retain itself using the updated semantic data type for the target column of the evaluated rectangular dataset. In embodiments, the system may analyze new rectangular datasets to determine unknown semantic data types of new target columns. As more semantic data types are determined for each target column of a given dataset, the system may become more accurate at predicting unknown data types for various columns having unknown data types.

In some embodiments, the machine learning model 112 may be configured to automatically retrain itself without verifying the predicted semantic data type for a target column. For example, in some embodiments, the machine learning model 112 may generate a likelihood value (e.g., a score) indicating how likely or probable that a target column is a specific semantic data type. This likelihood value may be compared to a predetermined threshold (e.g., range from 0 to 1, maximum value, minimum value, etc.) and if the threshold is met, the machine learning model may be retraining automatically, in response the likelihood value meeting the predetermined threshold. This obviates the need for the system to require administrator verification when performing retraining or data preparation procedures. However, in some embodiments, the system may still send a notification to inform a user that the machine learning model was retrained using the inferred/predicted semantic data for a given target column.

Figure 6:
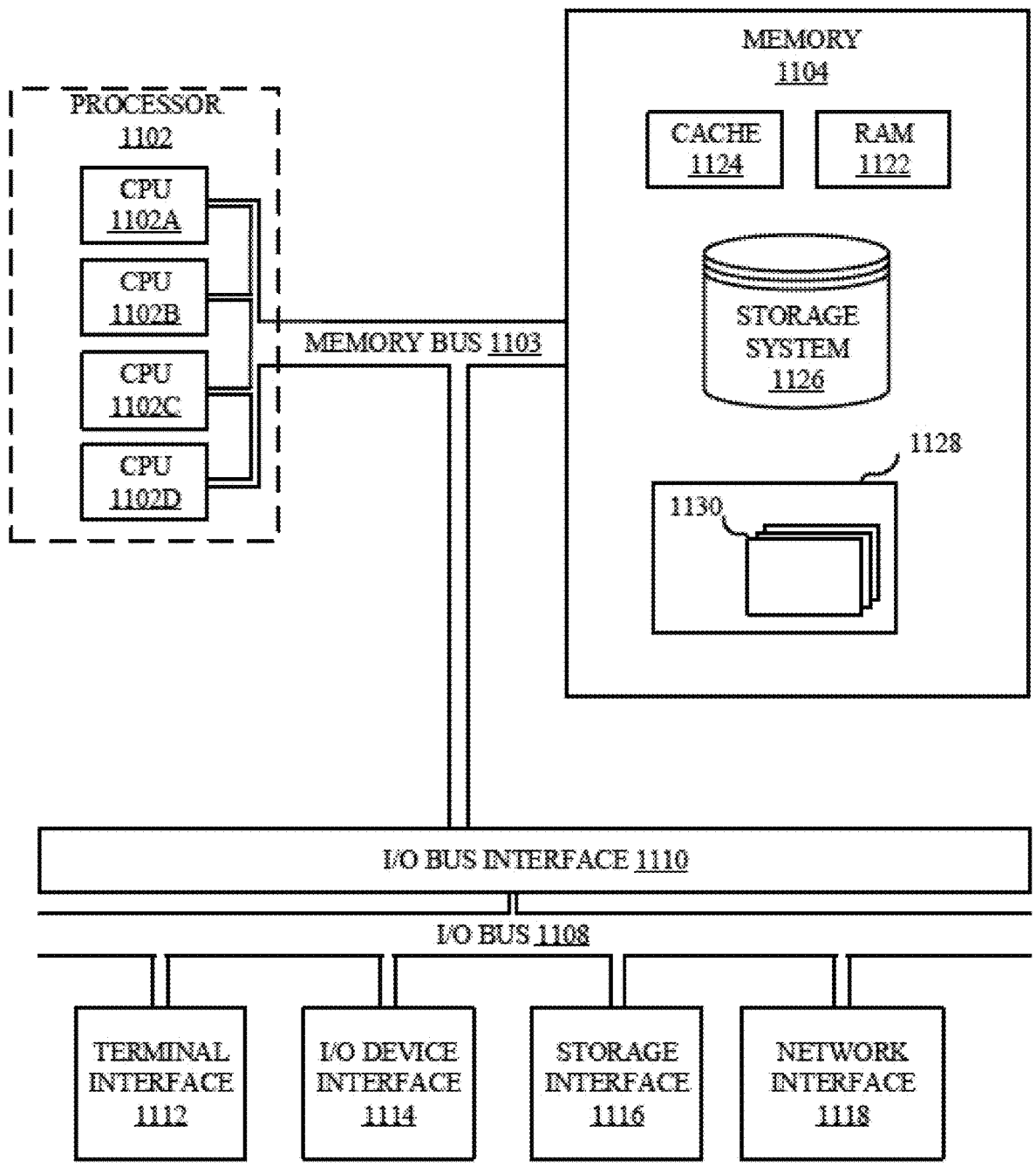
FIG. 6 illustrates a high-level block diagram of an example computer system that may be used in implementing one or more of the methods, tools, and modules, and any related functions, described herein, in accordance with embodiments of the present disclosure.

Referring now to FIG. 6, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 500).

System memory subsystem 1104 may include computer system readable media in the form of volatile memory, such as random-access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 6 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 1101. In some embodiments, however, individual components may have greater or lesser complexity than as represented in FIG. 6, components other than or in addition to those shown in FIG. 6 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various host devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
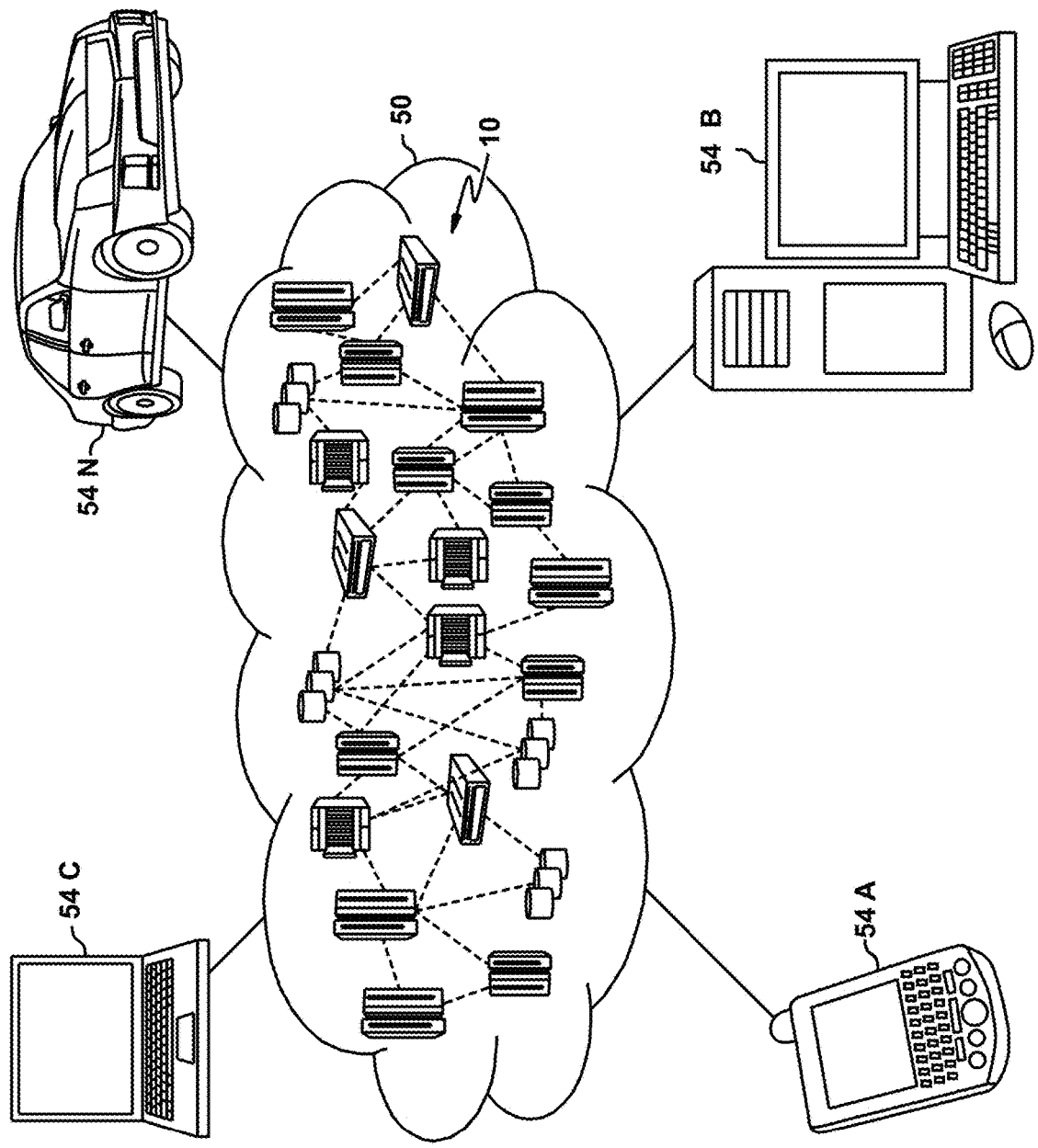
FIG. 7 depicts a cloud computing environment in accordance with embodiments of the present disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
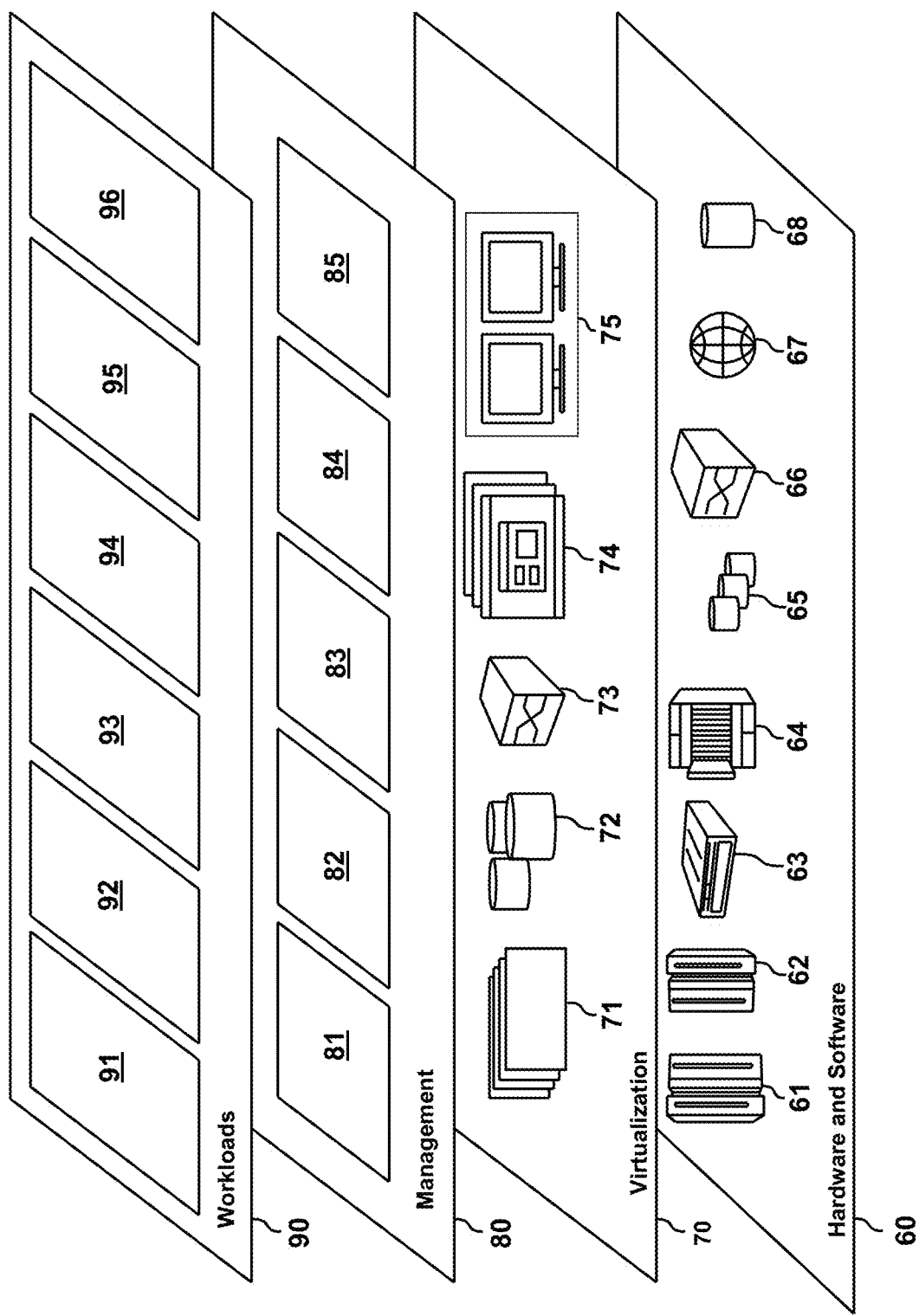
FIG. 8 depicts abstraction model layers in accordance with embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and semantic type classification software 68 in relation to the semantic type classification system 100 of FIG. 1.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and semantic data type classification 96. For example, semantic data type classification system 100 of FIG. 1 may be configured to perform semantic data type classification using workloads layer 90.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
receiving one or more rectangular datasets, wherein the one or more rectangular datasets comprise a plurality of columns having a set of known semantic data types;
extracting a set of features from the plurality of columns, wherein the set of features is used to determine a relationship among each column of the plurality of columns;
constructing a set of training data based on the extracted set of features;
training, using the set of training data, a machine learning model to predict a semantic data type of a target column in a rectangular dataset having an unknown semantic data type;
receiving a first rectangular dataset, wherein the first rectangular dataset contains a first target column having a first unknown semantic data type and a first plurality of other columns containing known semantic data types;

analyzing, using the machine learning model, a first set of local features associated with the first target column;

correlating the first set of local features of the first target column with a set of known features of the first plurality of other columns of the first rectangular dataset, wherein at least one known feature includes a name of each column of the first plurality of columns; and predicting, based on the correlating, a likelihood that the first unknown semantic data type is a specific semantic data type.

2. The computer-implemented method of claim 1, wherein the first set of local features associated with the first target column is selected from the group of local features consisting of:

primitive data type of the first target column;
name of the first target column;
length of the first target column name; and
entropy of the first target column.

3. The computer-implemented method of claim 1, wherein the set of known features associated with the first plurality of other columns of the first rectangular dataset is further selected from the group of known features consisting of:

a total number of columns in the first rectangular dataset;
entropy of each column of the plurality of other columns; and
a correlation coefficient between the first target column and each of the plurality of other columns.

4. The computer-implemented method of claim 1, further comprising:

receiving a user verification indicating that the likelihood of the first unknown semantic data type being the specific semantic data type is accurate; and retraining, in response to the user verification, the machine learning model using the first rectangular dataset, wherein the first target column is classified as the specific semantic data type.

5. The computer-implemented method of claim 4, further comprising:

analyzing, using the retrained machine learning model, a second rectangular dataset to determine a second unknown semantic data type of a second target column.

6. The computer-implemented method of claim 1, wherein the likelihood includes a likelihood value and the method further comprises:

comparing the likelihood value to a predetermined threshold; and retraining automatically, in response the likelihood value meeting the predetermined threshold, the machine learning model using the specific semantic data type of the first target column of the first rectangular dataset.

7. The computer-implemented method of claim 1, wherein the set of training data comprises one or more feature vectors.

8. The computer-implemented method of claim 1, wherein the at least one known feature further includes an entropy value for a set of data of each column of the plurality of other columns.

9. The computer-implemented method of claim 8, wherein the entropy value for the set of data of each column of the plurality of other columns is compared to an entropy threshold.

10. The computer-implemented method of claim 9, wherein the set of data for a first other column is ignored if the entropy value exceeds the entropy threshold.

11. A system comprising:

a processor; and a computer-readable storage medium communicatively coupled to the processor and storing program instructions which, when executed by the processor, cause the processor to perform a method comprising:

receiving one or more rectangular datasets, wherein the one or more rectangular datasets comprise a plurality of columns having a set of known semantic data types;

extracting a set of features from the plurality of columns, wherein the set of features is used to determine a relationship among each column of the plurality of columns;

constructing a set of training data based on the extracted set of features;

training, using the set of training data, a machine learning model to predict a semantic data type of a target column in a rectangular dataset having an unknown semantic data type;

receiving a first rectangular dataset, wherein the first rectangular dataset contains a first target column having a first unknown semantic data type and a first plurality of other columns containing known semantic data types;

analyzing, using the machine learning model, a first set of local features associated with the first target column;

correlating the first set of local features of the first target column with a set of known features of the first plurality of other columns of the first rectangular dataset, wherein at least one known feature includes a name of each column of the first plurality of columns; and predicting, based on the correlating, a likelihood that the first unknown semantic data type is a specific semantic data type.

12. The system of claim 11, wherein the first set of local features associated with the first target column is selected from the group of local features consisting of:

primitive data type of the first target column;
name of the first target column;
length of the first target column name; and
entropy of the first target column.

13. The system of claim 11, wherein the set of known features associated with the first plurality of other columns of the first rectangular dataset is further selected from the group of known features consisting of:

a total number of columns in the first rectangular dataset;
entropy of each column of the plurality of other columns; and
a correlation coefficient between the first target column and each of the plurality of other columns.

14. The system of claim 11, wherein the method performed by the processor further comprises:

receiving a user verification indicating that the likelihood of the first unknown semantic data type being the specific semantic data type is accurate;

retraining, in response to the user verification, the machine learning model using the first rectangular dataset, wherein the first target column is classified as the specific semantic data type; and analyzing, using the retrained machine learning model, a second rectangular dataset to determine a second unknown semantic data type of a second target column.

15. The system of claim 11, wherein the likelihood includes a likelihood value and the method further comprises:
  comparing the likelihood value to a predetermined threshold; and
  retraining automatically, in response the likelihood value meeting the predetermined threshold, the machine learning model using the specific semantic data type of the first target column of the first rectangular dataset.

16. A computer program product comprising a computer-readable storage medium having program instructions embodied therewith, the program instructions executable by a processor to cause the processor to perform a method comprising:
  receiving one or more rectangular datasets, wherein the one or more rectangular datasets comprise a plurality of columns having a set of known semantic data types;
  extracting a set of features from the plurality of columns, wherein the set of features is used to determine a relationship among each column of the plurality of columns;
  constructing a set of training data based on the extracted set of features;
  training, using the set of training data, a machine learning model to predict a semantic data type of a target column in a rectangular dataset having an unknown semantic data type;
  receiving a first rectangular dataset, wherein the first rectangular dataset contains a first target column having a first unknown semantic data type and a first plurality of other columns containing known semantic data types;
  analyzing, using the machine learning model, a first set of local features associated with the first target column;
  correlating the first set of local features of the first target column with a set of known features of the first plurality of other columns of the first rectangular dataset, wherein at least one known feature includes a name of each column of the first plurality of columns; and
  predicting, based on the correlating, a likelihood that the first unknown semantic data type is a specific semantic data type.

17. The computer program product of claim 16, wherein the first set of local features associated with the first target column is selected from the group of local features consisting of:
  primitive data type of the first target column;
  name of the first target column;
  length of the first target column name; and
  entropy of the first target column.

18. The computer program product of claim 16, wherein the set of known features associated with the first plurality of other columns of the first rectangular dataset is further selected from the group of known features consisting of:
  a total number of columns in the first rectangular dataset;
  entropy of each column of the plurality of other columns; and
  a correlation coefficient between the first target column and each of the plurality of other columns.

\* \* \* \* \*